Jan. 9, 1934.    M. PARKER    1,943,227
PRESSURE SEAL FOR SHAFTS
Filed April 25, 1932
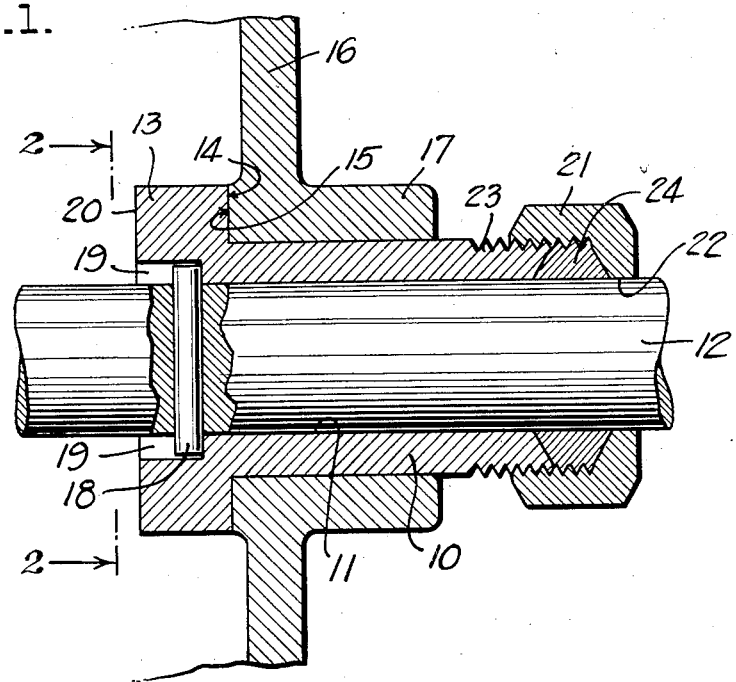
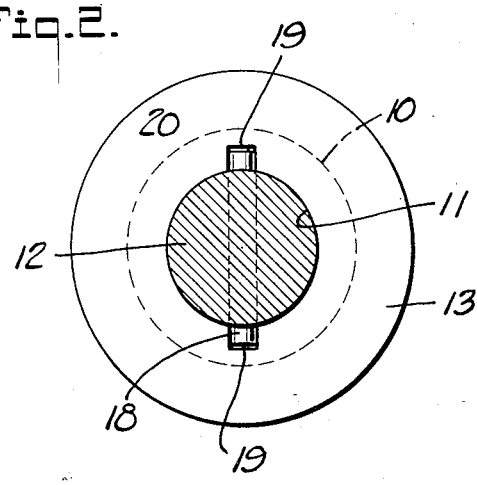
INVENTOR.
MARSHALL PARKER
BY
ATTORNEYS.

Patented Jan. 9, 1934

1,943,227

UNITED STATES PATENT OFFICE 1,943,227

PRESSURE SEAL FOR SHAFTS

Marshall Parker, South Gate, Calif., assignor of one-half to Herbert S. Walker, South Gate, Calif.

Application April 25, 1932. Serial No. 607,439

2 Claims. (Cl. 308—134)

This invention relates generally to pressure seals or packing and has for a purpose the provision of a pressure seal which, in its association with pumps, turbines, rotary engines and other devices in which fluid pressure is developed, effectively prevents the leakage of the fluid under pressure from the device between the rotor or shaft thereof and the bearings in which such rotary parts are journaled.

It is a further purpose of the invention to provide a pressure seal structurally characterized in a manner to automatically compensate for wear and function with maximum efficiency without attention over a long period of time.

Only one form of the invention will be described, following which its novel features will be pointed out in claims.

In the accompanying drawing,

Figure 1 is a view showing in longitudinal central section the pressure seal applied to a shaft;

Figure 2 is a transverse sectional view taken on the line 2—2 of Figure 1 and looking in the direction of the arrows.

Referring specifically to the drawing, wherein similar reference characters designate similar parts in each of the several views, this invention in its present embodiment comprises a cylindrical body of suitable bearing metal in the form of a sleeve 10, the bore 11 of which is of such diameter as to snugly fit the shaft 12 to which it is to be applied and yet be capable of movement axially or longitudinally on the shaft.

At one end the sleeve 10 is provided with an outwardly projecting radial flange 13 of circular form, the inner or sealing face 14 of which is ground true and is adapted to abut a machine sealing face 15 formed on the casing 16 of the device in which the sleeve is journaled by means of a bearing 17 on the casing rotatably receiving the sleeve.

Extending diametrically through the shaft 12 is a pin 18, the ends of which project from the shaft into diametrically opposed recesses 19 extending axially of the sleeve from the outer face 20 of the flange, to the end of providing a splined connection between the shaft and sleeve compelling the latter to rotate with the shaft yet rendering the sleeve free to shift axially on the shaft as a result of the flange wearing away at its sealing face 15.

At its other end, the sleeve 10 is provided with a packing gland comprising a nut 21 of cup form having an opening 22 freely receiving the shaft 12, and mounted on an externally threaded portion 23 of the sleeve. Interposed between the nut and said end of the shaft is a body of packing 24 which co-acts with the sealing faces 14 and 15 of the sleeve and casing, respectively, to prevent the loss of pressure from the latter between the sleeve and casing and the sleeve and shaft.

It will be clear that as the shaft is rotating, the pressure within the casing 16 will maintain the flange 13 of the sleeve 10 in sealing engagement with the casing and that as wear occurs on the flange, the sleeve will merely shift bodily along the shaft to compensate for the wear, while the pin 18 and the recesses 19 co-act to maintain the operative connection between the sleeve and shaft to insure that the sleeve will rotate with the shaft.

It is to be noted that the length of the pin 18 and the radial dimension between the recesses 19 is considerably less than the outside diameter of the sleeve so that wear on the sealing face 14 of the flange 13 can continue without destroying the efficiency of the seal until the sleeve has shifted axially to such extent that the outer face 20 of the sleeve clears the pin and thus disrupts the driving connection between the shaft and sleeve. Furthermore, the recesses confine the pin against axial displacement to insure that the connection is maintained throughout the usual life of the seal.

What is claimed is:

1. In a pressure fluid device, a casing having a bearing; a shaft extending from the casing through the bearing; a sleeve mounted on the shaft and journaled in the bearing; a radial flange on one end of the sleeve having a lateral sealing face adapted to be urged by fluid pressure into sealing engagement with the casing; the flange having diametrically opposed recesses communicating with the bore of the sleeve and extending longitudinally of the sleeve from the outer face of the flange; and a pin extending diametrically through the shaft into the recesses to provide a splined connection compelling the sleeve to rotate with the shaft while rendering the sleeve free to shift axially as wear occurs on the sealing face of the flange.

2. In a pressure fluid device, a casing having a bearing; a shaft extending from the casing through the bearing; a sleeve mounted on the shaft and journaled in the bearing; a radial flange on one end of the sleeve having a lateral sealing face adapted to be urged by fluid pressure into sealing engagement with the casing; the flange having diametrically opposed recesses communicating with the bore of the sleeve and extending longitudinally of the sleeve from the outer face of the flange; a pin extending diametrically through the shaft into the recesses to provide a splined connection compelling the sleeve to rotate with the shaft while rendering the sleeve free to shift axially as wear occurs on the sealing face of the flange; a packing nut threadedly mounted on the other end of the sleeve and through which the shaft extends; and packing surrounding the shaft and interposed between the nut and said other end of the sleeve.

MARSHALL PARKER.